(12) United States Patent
McConoughey et al.

(10) Patent No.: US 11,691,541 B2
(45) Date of Patent: Jul. 4, 2023

(54) UTILITY VEHICLE

(71) Applicant: DEERE & COMPANY, Moline, IL (US)

(72) Inventors: Gregory O. McConoughey, Le Claire, IA (US); Brian M. Huenink, Cedar Grove, WI (US); Jeremy G. Hamilton, Le Claire, IA (US)

(73) Assignee: Deere & Company, Moline, IL (US)

(\*) Notice: Subject to any disclaimer, the term of this patent is extended or adjusted under 35 U.S.C. 154(b) by 177 days.

(21) Appl. No.: 17/158,883

(22) Filed: Jan. 26, 2021

(65) Prior Publication Data
US 2022/0234474 A1 Jul. 28, 2022

(51) Int. Cl.
*B60N 2/02* (2006.01)
*B60N 2/06* (2006.01)
(Continued)

(52) U.S. Cl.
CPC ............ *B60N 2/0244* (2013.01); *A01B 63/14* (2013.01); *B60N 2/062* (2013.01); *B60N 2/14* (2013.01);
(Continued)

(58) Field of Classification Search
CPC ........ B60N 2/0244; B60N 2/062; B60N 2/14; B60N 2/919; B60N 2/39; A01B 63/14; B62D 33/0617; B62D 49/06
See application file for complete search history.

(56) References Cited

U.S. PATENT DOCUMENTS

| | | | |
|---|---|---|---|
| 2,845,990 A * | 8/1958 | Hubert | B60N 2/143 297/344.22 |
| 4,467,252 A | 8/1984 | Takeda et al. | |

(Continued)

FOREIGN PATENT DOCUMENTS

| | | | | |
|---|---|---|---|---|
| DE | 102004054144 A1 * | 5/2006 | ........... | A01D 43/087 |
| DE | 102004054144 A1 | 5/2006 | | |

(Continued)

OTHER PUBLICATIONS

Machine translation of DE102004054144 (Year: 2006).*
German Search Report issued in application No. DE102021207674. 2, dated Dec. 17, 2021, 6 pages.

*Primary Examiner* — Paul N Dickson
*Assistant Examiner* — Kurtis Nielson
(74) *Attorney, Agent, or Firm* — Michael Best & Friedrich LLP

(57) ABSTRACT

A utility vehicle includes a chassis and a work implement movably coupled to the chassis. An operator support is positioned within an operator cab. The operator support includes a seat and a backrest coupled to the seat. A position of the operator support is selectively adjustable relative to the chassis. The utility vehicle further includes a control system in communication with the operator support. The control system includes a sensor operable to sense a position of the work implement relative to the chassis, and a controller including a processor and a memory. The controller is configured to receive a signal from the sensor representative of the position of the work implement. The controller is further configured to generate a signal to automatically adjust the position of the operator support relative to the chassis based in part on the position of the work implement relative to the chassis.

20 Claims, 5 Drawing Sheets

(51) Int. Cl.
*B60N 2/14* (2006.01)
*A01B 63/14* (2006.01)
*B60N 2/90* (2018.01)
*B62D 49/06* (2006.01)
*B62D 33/06* (2006.01)
*B60N 2/39* (2006.01)

(52) U.S. Cl.
CPC ......... *B60N 2/919* (2018.02); *B62D 33/0617* (2013.01); *B62D 49/06* (2013.01); *B60N 2/39* (2013.01)

(56) References Cited

U.S. PATENT DOCUMENTS

| | | | | |
|---|---|---|---|---|
| 6,039,141 | A | * | 3/2000 | Denny ................... B60N 2/14 296/190.01 |
| 7,059,680 | B2 | | 6/2006 | Billger et al. |
| 10,011,191 | B2 | * | 7/2018 | Reif ....................... B60N 2/062 |
| 2016/0101710 | A1 | * | 4/2016 | Bonk ................... B60N 2/0252 297/217.2 |
| 2019/0283634 | A1 | * | 9/2019 | Parker ..................... B60N 2/52 |
| 2019/0375313 | A1 | * | 12/2019 | Biberdorf ............ B60N 2/0296 |
| 2021/0114553 | A1 | * | 4/2021 | Awtar ................ G01C 21/3691 |
| 2021/0221270 | A1 | * | 7/2021 | Ward ....................... B60N 2/39 |

FOREIGN PATENT DOCUMENTS

| | | | |
|---|---|---|---|
| DE | 102010046205 A1 | 3/2012 | |
| DE | 102016202173 A1 | 8/2017 | |
| JP | H05112167 A | 5/1993 | |

\* cited by examiner

UTILITY VEHICLE

FIELD OF THE DISCLOSURE

The present disclosure relates to a utility vehicle having a work implement movable relative to a chassis of the utility vehicle. Specifically, the present disclosure relates to a utility vehicle that manipulates the position of an operator support (e.g., a chair) based on the position of the work implement relative to the chassis.

SUMMARY OF THE DISCLOSURE

The present disclosure provides, in one aspect, a utility vehicle including a chassis, a prime mover supported by the chassis, a work implement movably coupled to the chassis, and an operator cab supported by the chassis. An operator support is positioned within the operator cab. The operator support includes a seat and a backrest coupled to the seat. The operator support is configured to support an operator of the utility vehicle. A position of the operator support is selectively adjustable relative to the chassis. The utility vehicle further includes a control system in communication with the operator support. The control system includes a sensor operable to sense a position of the work implement relative to the chassis, and a controller including a processor and a memory. The controller is configured to receive a signal from the sensor representative of the position of the work implement. The controller is further configured to generate a signal to automatically adjust the position of the operator support relative to the chassis based in part on the position of the work implement relative to the chassis.

The present disclosure provides, in another aspect, a utility vehicle including a chassis, a prime mover supported by the chassis, a work implement movably coupled to the chassis, and an operator cab supported by the chassis. An operator support is positioned within the operator cab. The operator support includes a seat and a backrest coupled to the seat. The operator support is configured to support an operator of the utility vehicle. A position of the operator support is selectively adjustable relative to the chassis. The utility vehicle further includes a control system in communication with the operator support. The control system includes a sensor operable to sense a position of the work implement relative to the chassis, and a controller including a processor and a memory. The controller is configured to receive a signal from the sensor representative of the position of the work implement. The controller is further configured to generate a signal to permit adjustment of the position of the operator support relative to the chassis based in part on the position of the work implement relative to the chassis.

The present disclosure provides, in yet another aspect, a utility vehicle including a chassis, a prime mover supported by the chassis, a work implement movably coupled to the chassis, and an operator cab supported by the chassis. An operator support is positioned within the operator cab. The operator support includes a seat and a backrest coupled to the seat. The operator support is configured to support an operator of the utility vehicle. A position of the operator support is selectively adjustable relative to the chassis. The utility vehicle further includes a control system in communication with the operator support. The control system includes a sensor assembly operable to sense an angle of incline of a ground surface upon which the utility vehicle moves, and a controller including a processor and a memory. The controller is configured to receive a signal from the sensor assembly representative of the angle of incline. The controller is further configured to generate a signal to permit adjustment of the position of the operator support relative to the chassis based in part on the angle of incline.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
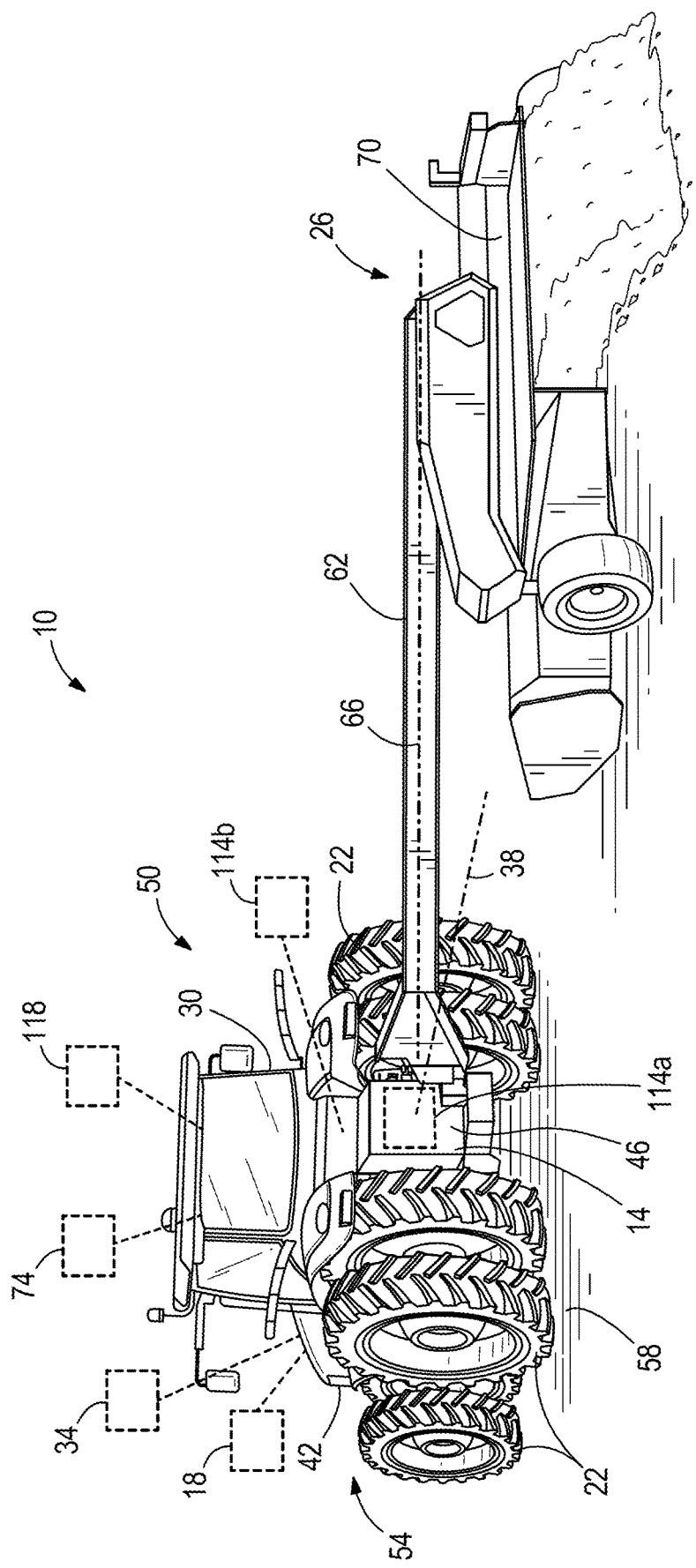
FIG. 1 shows a perspective view of a utility vehicle including an operator cab and a work implement.

FIG. 1 illustrates a utility vehicle 10. The utility vehicle 10 is in the form of a tractor; however, the utility vehicle 10 may be, for example, a riding lawn mower, harvester, crop sprayer, or other utility vehicle for agricultural, forestry, construction, mining, or other commercial or industrial use. The utility vehicle 10 includes a chassis 14, a prime mover 18, a plurality of ground-engaging devices 22, a work implement 26, an operator cab 30, and a control system 34.

The vehicle 10 includes a longitudinal axis 38 extending therethrough. The vehicle 10 includes a front end 42 and a rear end 46 opposite the front end 42. The longitudinal axis 38 extends through the front end 42 and the rear end 46. The longitudinal axis 38 divides the vehicle 10 into a first side 50 and a second side 54.

The chassis 14 of the vehicle 10 supports the prime mover 18, the operator cab 30, and the control system 34. The prime mover 18 is configured to move the utility vehicle 10 in a direction of travel via the ground engaging devices 22. The illustrated ground-engaging devices 22 are wheels, but tracks or other suitable ground-engaging devices can be utilized. The prime mover 18 can include an engine, such as a diesel engine, and the control system 24 can include a vehicle control unit (VCU). The prime mover 18 is configured to move the vehicle 10 along a surface 58, such as ground, terrain, or any other typography upon which the vehicle 10 traverses. In particular, the vehicle 10 is operable to move along a direction of travel coinciding with the longitudinal axis 38 of the vehicle 10. This may be referred to as a forward/rearward movement of the vehicle 10.

The work implement 26 is movably coupled to the chassis 14. In the illustrated embodiment, the work implement 26 is a cutter movably coupled to the rear end 46 of the vehicle 10. In other embodiments, the utility vehicle 10 may include any suitable work implement 26 (e.g., a ripper, front end loader, bucket, manure spreaders, planter, tillage, grain cart, balers, mowers, harvesters, etc.), and the work implement 26 may be coupled instead to the front end 42 of the vehicle 10. Still in other embodiments, more than one work implement 26 may be coupled to the chassis 14. For example, a first implement may be coupled to the front end 42 and a second implement may be coupled to the rear end 46. The work implement 26 is configured to perform work of the utility vehicle 10.

The work implement 26 is movable relative to the chassis 14 between a plurality of positions. In particular, the work implement 26 is movable relative to the longitudinal axis 38 of the vehicle 10. For example, as shown in FIG. 1, the work implement 26 is positioned in a first position in which the work implement 26 is positioned on the first side 50 of the vehicle 10. The work implement 26 is positionable in a second position in which the work implement 26 is positioned on the second side 54 of the vehicle 10. In addition, the work implement 26 may be positioned in a third position in which the work implement 26 is aligned with the longitudinal axis 38.

In the illustrated embodiment, the work implement 26 includes an arm 62 pivotably coupled to the chassis 14. As such, the work implement 26 is pivotable between the first, second, and third positions relative to the chassis 14. In particular, the arm 62 defines a pivot axis 66. The pivot axis 66 of the arm 62 extends at an acute angle relative to the longitudinal axis 38 when the work implement 26 is in the first position and the second position. The pivot axis 66 of the arm 62 extends colinear with the longitudinal axis 38 when the work implement 26 is in the third position. The arm 62 of the work implement 26 is configured to facilitate positioning of a head 70 of the work implement 26 (e.g., having blades) in a desired position relative to the chassis 14.

Figure 2:
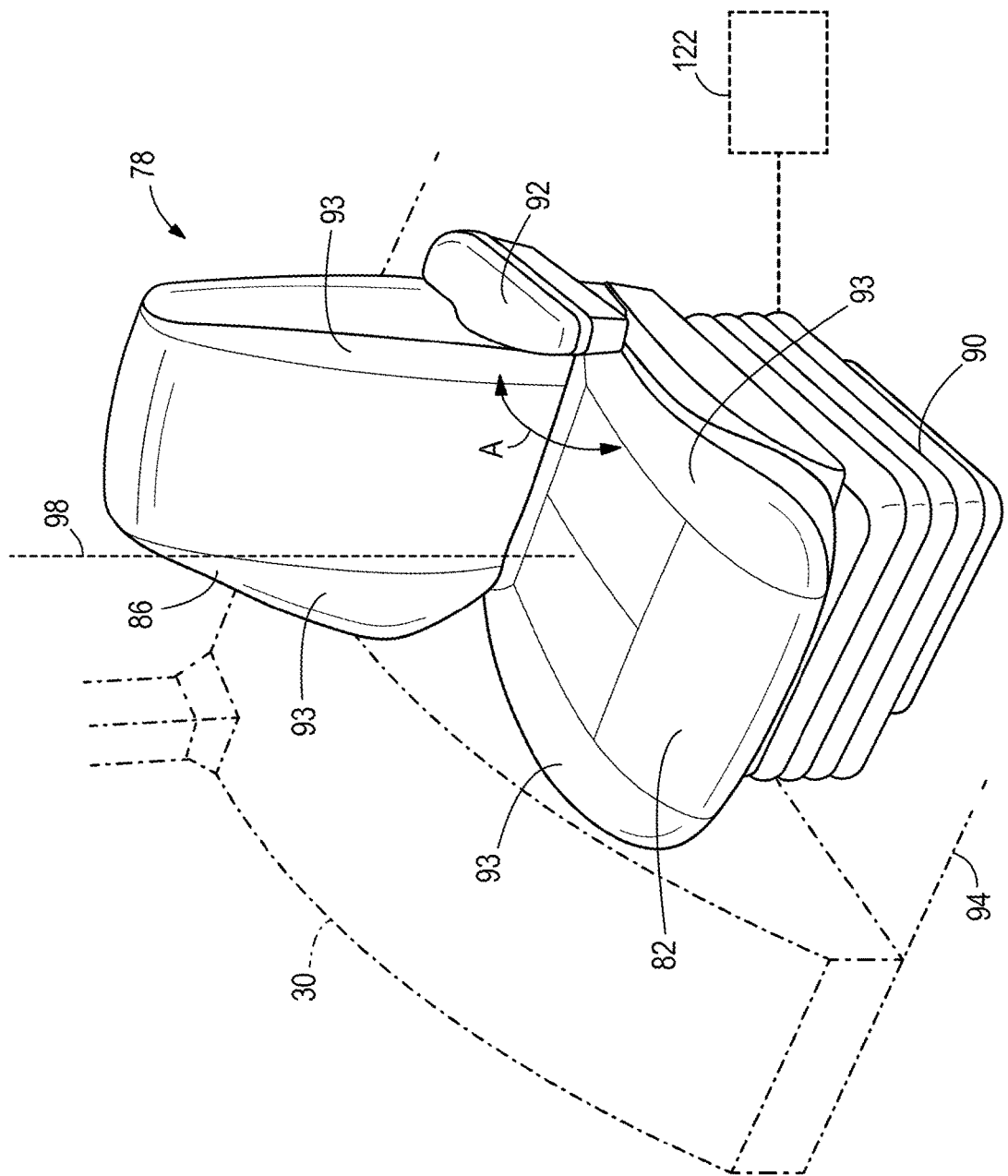
FIG. 2 shows a perspective view of an operator support positioned within the operator cab of the vehicle of FIG. 1.

With respect to FIGS. 1-2, the operator cab 30 is coupled to the chassis 14. The operator cab 30 defines a space suitable to receive at least one individual (referenced herein as an "operator") to operate the vehicle 10. The cab 30 includes a vehicle operation system 74 and an operator support 78 (FIG. 2). The vehicle operation system 74 is positioned in the cab 30 and can include different combinations of input devices. For example, in some embodiments, the vehicle operation system 74 may include a joystick and a control display (e.g., a touch screen display device having manual actuators). In other embodiments, the vehicle operation system 74 includes other or additional input devices, such as a steering wheel, control levers, control pedals, and other suitable input devices. The input devices are used by an operator for operating the utility vehicle 10 (e.g., operating movement of the utility vehicle 10 along the direction of travel, operating movement of the work implement 26, etc.).

With particular reference to FIG. 2, the operator support 78 is a chair. As shown, the chair 78 may include a seat 82 and a backrest 86 coupled to the seat 82 and extending transversely therefrom. In addition, the seat 82 includes a base 90 supported by a floor surface 94 of the chassis 14. The floor surface 94 at least partially defines the space of the operator cab 30. The illustrated chair 78 further includes an armrest 92 pivotably coupled to the backrest 86. The seat 82 and backrest 86 may be made of a number of different materials and both generally include a rigid structure or frame (e.g., metal, rigid plastic, etc.) that provides the general shape and support for the operator, a compressible material such as a foam placed on the frame for cushion, comfort, and ergonomics, and a cover (e.g., nylon, leather, etc.) that holds the compressible material relative to the frame. The seat 82 and/or the backrest 86 may in particular include cushion bolsters 93 that provide lateral support for the operator.

The operator support 78 is movable or adjustable relative to the chassis 14 (and/or the cab 30). More specifically, the operator support 78 is movable relative to the floor surface 94. In some embodiments, the operator support 78 may move or translate side to side (left and right from the frame of reference of FIG. 1), forward, rearward, up, and down, and/or may also be rotatable about an axis 98 (FIG. 2). In some embodiments, the backrest 86 is movably or adjustably coupled to the seat 82 to adjust an angle A therebetween. The operator is typically seated in the operator support 78 during use and positioned to actuate one or more input devices of the vehicle operation system 74 for purposes of operating movement of the utility vehicle 10 and the attached implement 26.

Figure 3:
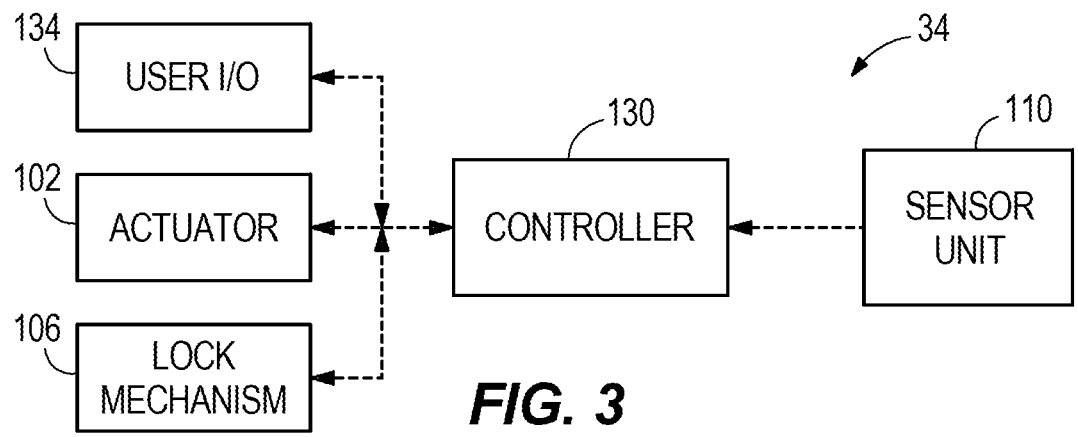
FIG. 3 is a schematic of a control system of the utility vehicle of FIG. 1.

With reference to FIGS. 2 and 3, the utility vehicle 10 also includes an actuator 102 (FIG. 3) (e.g., motor, pneumatic cylinder, etc.) operatively coupled to the operator support 78. The actuator 102 may be coupled to the base 90 of the operator support 78. The actuator 102 adjusts the position of the operator support 78 relative to the chassis 14. More specifically, the actuator 102 is operable to move the operator support 78 for adjusting the position of the operator support 78 relative to the floor surface 94.

The operator support 78 may be movable between a plurality of positions. In a first position, the operator support 78 may be positioned closer to the first side 50 of the vehicle 10 (i.e., within the operator cab 30). In a second position, the operator support 78 may be positioned closer to the second side 54 of the vehicle 10 (i.e., within the operator cab 30). More specifically, the operator support 78 may be moved linearly and/or rotated to position the operator support 78 closer to the first side 50 or the second side 54 of the vehicle 10. This may facilitate viewing of the first side 50 and the second side 54 of the vehicle 10 by the operator while the operator remains seated in the operator support 78.

In further embodiments, the operator support 78 may be moved to a third position intermediate the first and second positions. In the third position, the operator support 78 is aligned with the longitudinal axis 38 such that the operator is positioned to view both the first and second sides 50, 54, respectively, of the vehicle 10 equally. This third position may be referred to as a home position of the operator support 78.

With continued reference to FIGS. 2 and 3, the utility vehicle 10 further includes a lock mechanism 106 operatively coupled to the operator support 78. The lock mechanism 106 may be positioned between the base 90 of the operator support 78 and the floor surface 94. The lock mechanism 106 is selectively adjustable between a first, locked (on) state in which the operator support 78 is maintained in the chosen position (e.g., first, second, third position, etc.) relative to the chassis 14, and a second, unlocked (off) state in which the operator support 78 is permitted to move relative to the chassis 14. Accordingly, the lock mechanism 106 may inhibit or prevent movement of the operator support 78 relative to the chassis 14 unless the lock mechanism 106 is in the unlocked state.

With reference to FIGS. 1 and 3, the utility vehicle 10 includes a sensor unit 110 supported by the chassis 14. The sensor unit 110 includes one or more sensors 114a, 114b, 118 configured to detect information relating to a position of the work implement 26 relative to the chassis 14 and/or a position of the vehicle 10 relative to the surface or ground 58. The sensor unit 110 can encompass sensors 114a, 114b, 118 positioned at any position within the cab 30, external to the cab 30, or otherwise associated with the utility vehicle 10 or implement 26 to detect or record operating information. For example, the chassis 14 may include the sensor(s) positioned at the rear end 46 and/or the front end 42 of the utility vehicle 10. In addition, the sensor(s) may be positioned within the arm 62 of the work implement 26. The sensor(s) may be one or more of a Hall-effect sensor, a proximity sensor (optical such as photoelectric, inductive, capacitive, etc.), potentiometer, or the like. The illustrated sensor 114a detects information relating to a location/position of the implement 26 relative to the chassis 14. More specifically, the sensor detects whether the work implement 26 is positioned on the first side 50 or the second side 54 of the utility vehicle 10. The sensor unit 110 may alternatively or further include or be in communication with one or more cameras, lasers, (e.g., for LIDAR or other laser scanning), or scanners for detecting information relating to the location/position of the work implement 26.

The senor unit 110 may further include an inertial measurement unit 114b (or IMU 114b or inertial measurement sensor 114b). The inertial measurement unit 114b is positioned at a location on the vehicle 10. For example, the inertial measurement unit 114b is positioned on the chassis 14. More specifically, the inertial measurement unit 114b can be positioned in an engine compartment to detect an attitude of the vehicle 10 (e.g., a roll, a pitch, a yaw, a position of the vehicle 10 relative to the surface or ground 58, etc.). The inertial measurement unit 114b can detect changes in the position and/or orientation of the vehicle 10. More specifically, each inertial measurement unit 114b can detect changes in (or measures the position and/or orientation of) the vehicle 10 along up to three axes: an X-axis or roll, a Y-axis or pitch, and a Z-axis or yaw. The X-axis is colinear with the longitudinal axis 38 of the utility vehicle 10. The inertial measurement unit 114b can have a sensor associated with each axis that is being measured, such as a gyroscope and/or an accelerometer. The inertial measurement unit 114b provides sensor data associated with the position of the vehicle 10 along the measured axes with reference to a reference position. The reference position can include gravity or a preset location of a component of the vehicle 10 being measured (e.g., an orientation on a flat surface/ground 58, etc.). The inertial measurement unit 114b tracks the position of the associated component during operation of the vehicle 10.

Figure 1A:
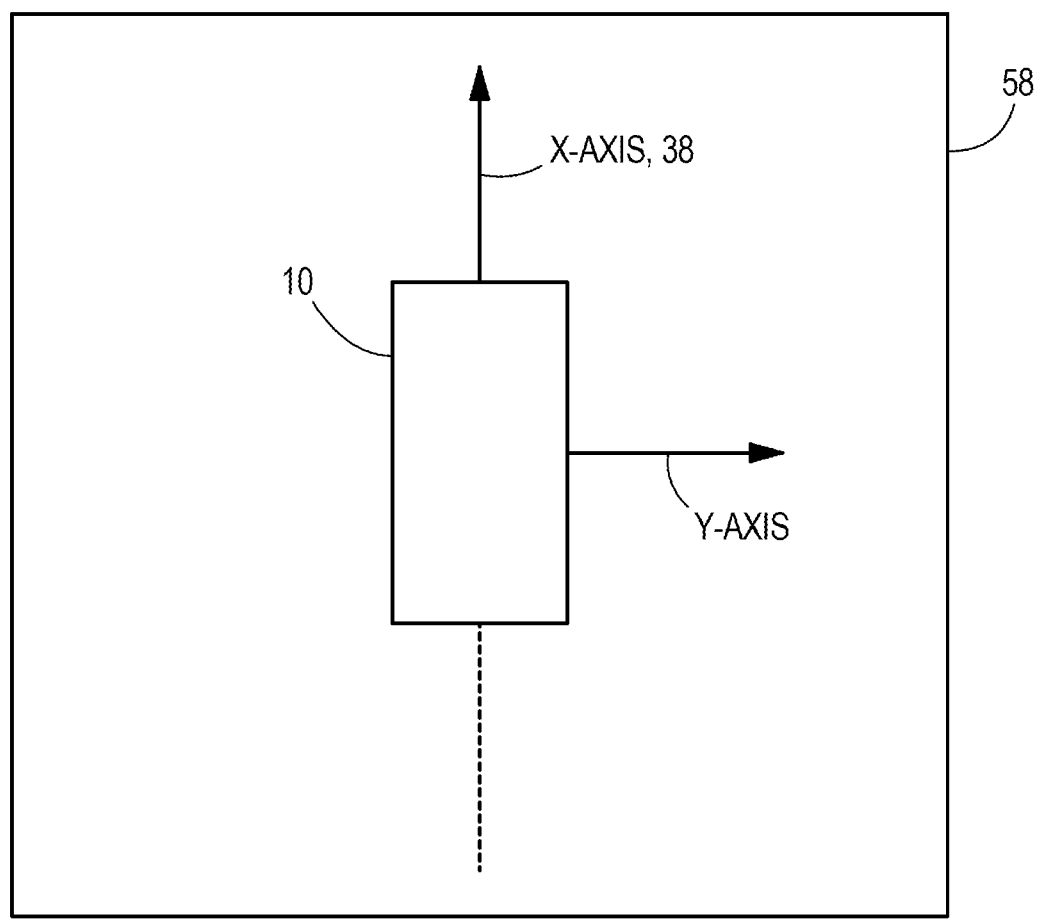
FIG. 1A is an overhead schematic layout of the utility vehicle of FIG. 1 to illustrate the axis along which the position of the vehicle is measured relative to the ground on which the vehicle operates.

As shown in FIG. 1A, the inertial measurement unit 114b detects at least a roll of the vehicle 10. Stated another way, the inertial measurement unit 114b detects the distance the vehicle 10 rotates around an X-axis. The inertial measurement unit 114b also detects at least a pitch of the vehicle 10. Stated another way, the inertial measurement unit 114b detects the distance the vehicle 10 rotates around a Y-axis, the Y-axis being perpendicular to the X-axis. It should be appreciated that more than one inertial measurement unit 114b can be integrated into the vehicle 10. In addition, the inertial measurement unit 114b can be positioned at any position on the vehicle 10 suitable to measure the attitude and/or orientation of the vehicle 10 (e.g., a roll, a pitch, a yaw, etc.) relative to the surface or ground 58. For example, the inertial measurement unit 114b can be positioned on a portion of the work implement 26. The inertial measurement unit 114b is configured to detect an angle of incline of the surface or ground 58 along which the utility vehicle 10 is moving.

With reference to FIG. 1, the sensor unit 110 of the vehicle 10 may further include a vehicle location sensor 118, illustrated as a Global Positioning System (GPS) receiver 118. In the illustrated embodiment, the vehicle GPS receiver 118 is illustrated as positioned on the operator cab 30. In other embodiments, the vehicle GPS receiver 118 can be positioned on any suitable location of the vehicle 10 (e.g., on the chassis 14, on the arm 62 of the work implement 26, etc.). The GPS receiver 118 can provide real time location data (or location information) relating to the position of the vehicle 10. The vehicle location sensor 118 may be used by the control system 34 to detect an angle of incline, as further discussed below.

With reference to FIG. 2, the sensor unit 110 may further include one or more sensors 122 configured to detect information relating to a position of the operator support 78 relative to the chassis 14. In some embodiments, the sensor 122 is configured to detect a position of the operator support 78 relative to the floor surface 94, one or more sides of the operator cab 30, etc. The sensor 122 may be the same or similar as the sensor 114a. The sensor 122 may be used by the control system 34 in controlling movement of the operator support 78, as further discussed below.

With reference to FIGS. 1-3, the control system 34 includes a controller 130 with a plurality of inputs and outputs that are operable to receive and transmit information and commands to and from different components, such as the vehicle operation system 74, the operator support 78, and the sensor unit 110. Communication between the controller 130 and the different components can be accomplished through a CAN (e.g., an ISO bus), another communication link (e.g., wireless transceivers), or through a direct connection. The control system 34 further includes a user input/output module 134 that includes the one or more operator input devices of the vehicle operation system 74, which are in communication with the controller 130, as well as an output device such as the control display device located in the cab 30. The input/output module 134 receives input from the sensor unit 110.

The controller 130 includes memory for storing software, logic, algorithms, programs, a plurality of settings, which include a set of instructions for controlling the movement of the work implement 26 and the operator support 78, among other components. The controller 130 also includes a processor for carrying out or executing the software, logic, algorithms, programs, set of instructions, etc. stored in the memory.

Often during operation of the utility vehicles 10, the operator may switch the work implement 26 between the first position (i.e., in which the work implement 26 is on the first side 50 of the utility vehicle 10) and the second position (i.e., in which the work implement 26 is on the second side 54 of the utility vehicle 10). The operator support 78 may be controlled to move (either automatically or manually) to position the operator support 78 in the first position (i.e., in which the operator support 78 is positioned closer to the first side 50) and the second position (i.e., in which the operator support 78 is positioned closer to the second side 54) coinciding with the position of the work implement 26.

Figure 4:
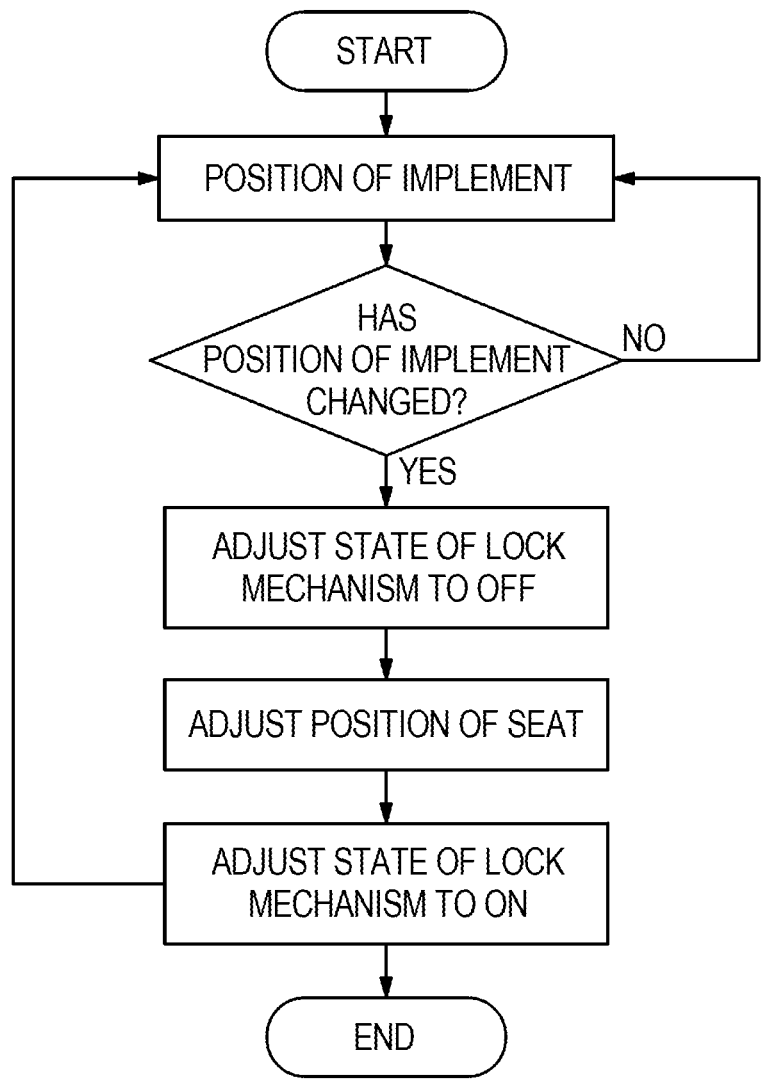
FIG. 4 is a flow chart illustrating one example of a control process for controlling a position of the operator support based on a position of the work implement.

With reference to FIG. 4, the controller 130 is configured to receive a signal from the sensor unit 110 representative of the position of the work implement 26. More specifically, the sensor unit 110 detects (e.g., via the sensor 114a) the position of the work implement 26, and sends a signal to the controller 130. The controller 130 is further configured to generate a signal to automatically adjust the position of the operator support 78 relative to the chassis 14 based in part on the position of the work implement 26 relative to the chassis 14. More specifically, the controller 130 is configured to generate a signal based on the information detected by the sensor unit 110.

In an exemplary embodiment, the controller 130 receives the signal from the sensor 114a that the position of the work implement 26 has been adjusted (e.g., from the first side 50 to the second side 54 of the vehicle 10) and sends a signal to actuate the actuator 102 to adjust the position of the operator support 78 (e.g., from the first position to the second position). In this embodiment, the position of the operator support 78 is automatically adjusted based on the position of the work implement 26.

In some embodiments, the controller 130 receives the signal from the sensor 114a that the position of the work implement 26 has been adjusted (e.g., from the first side 50 to the second side 54 of the vehicle 10) and sends a signal to adjust the lock mechanism 106 from the locked state to the unlocked state. The controller 130 may then further send a signal to actuate the actuator 102 to adjust the position of the operator support 78 (e.g., from the first position to the second position). In this embodiment, the position of the operator support 78 is automatically adjusted based on the position of the work implement 26. The controller 130 may be further configured to send a signal to adjust the lock mechanism 106 from the unlocked state to the locked state after the position of the operator support 78 has been adjusted. The controller 130 may use the sensor 122 to determine whether the operator support 78 has been adjusted.

In alternative embodiments, the controller 130 only sends a signal to adjust the lock mechanism 106 from the locked state the to the unlocked state after the position of the work implement 26 has been adjusted. Once the lock mechanism 106 is adjusted into the locked state, the operator may then use the force of gravity and/or body weight to adjust the position of the operator support 78 (e.g., from the first position to the second position). In this embodiment, the lock mechanism 106 is automatically adjusted to the unlocked state based on the position of the work implement 26, and the position of the operator support 78 is manually adjusted. Accordingly, the controller 130 is configured to generate a signal to permit adjustment of the position of the operator support 78 relative to the chassis 14.

In further embodiments, the controller 130 receives a signal from the user input/output module 134 that the operator has adjusted the position of the work implement 26 using one or more of the input devices (e.g., pressing of a button) of the vehicle operation system 74. The controller 130 is then configured to send a signal to adjust the lock mechanism 106 from the locked state to the unlocked state and/or send a signal to actuate the actuator 102 to adjust the position of the operator support 78 (e.g., from the first position to the second position).

In yet further embodiments, the controller 130 sends a signal to the output device (e.g., the control display device) of the user input/output module 134 that the position of the work implement 26 has been adjusted (e.g., from the first position to the second position) by the operator using the input devices of the vehicle operation system 74. The controller 130 is then configured to send a signal to inquire from the operator seated in the operator support 78 whether to adjust the lock mechanism 106 from the locked state to the unlocked state and/or to actuate the actuator 102 to adjust the position of the operator support 78 (e.g., from the first position to the second position). The operator may use one or more of the input devices (e.g., pressing a button) of the vehicle operation system 74 to adjust the lock mechanism 106 and/or actuate the actuator 102. Alternatively, the operator may use one or more of the input devices to remain in the chosen position.

In further embodiments, the controller 130 is configured to detect via the sensor 122 the position of the operator support 78 relative to the chassis 14 (e.g., the operator support 78 is in the first position or the second position) before sending a signal to adjust the position of the operator support 78 and/or adjust the lock mechanism 106 from the unlocked state to the locked state.

Figure 5:
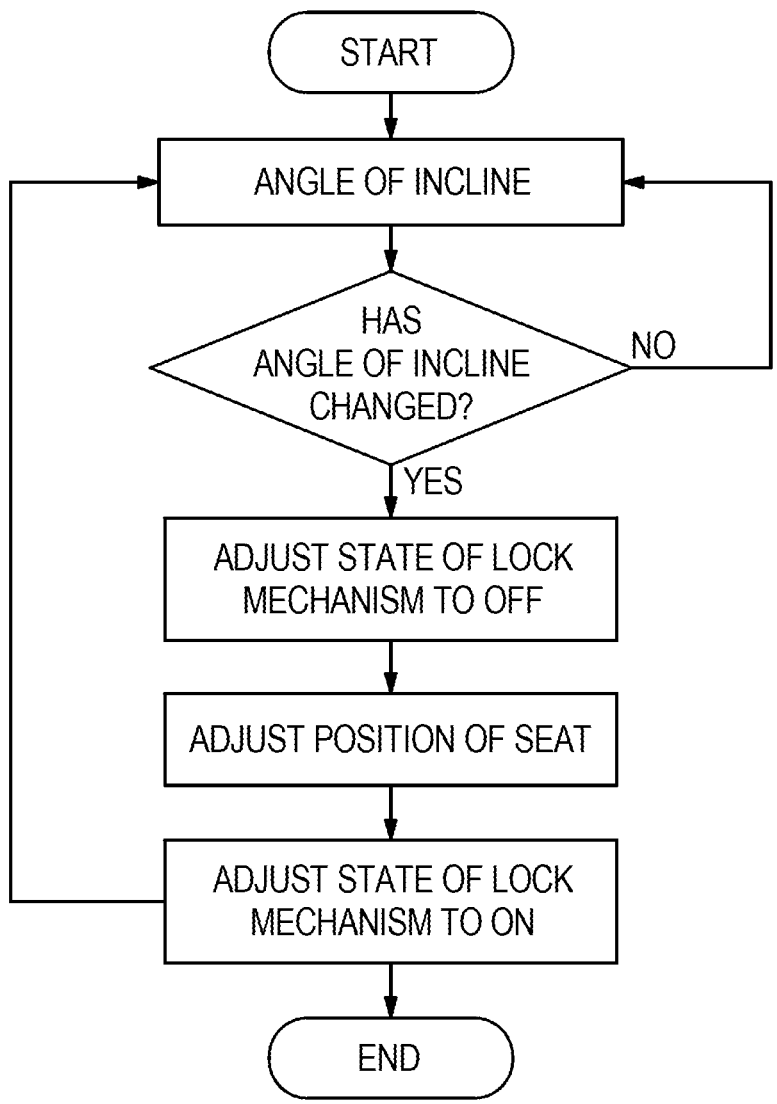
FIG. 5 is a flow chart illustrating another example of a control process for controlling a position of the operator support based on an angle of incline of the ground on which the vehicle operates.

Furthermore, with reference to FIG. 5, the position of the operator support 78 may be adjusted based on the angle of incline of the utility vehicle 10 relative to the surface or ground 58. The controller 130 is configured to receive a signal from the sensor unit 110 representative of the angle of incline of the surface or ground 58 along which the utility vehicle 10 is moving. More specifically, the sensor unit 110 detects (e.g., via the inertial measurement unit 114b) the angle of incline, and sends a signal to the controller 130. The controller 130 is further configured to generate a signal to permit adjustment of the operator support 78 and/or automatically adjust the position of the operator support 78 relative to the chassis 14, as discussed above.

In an exemplary embodiment, the controller 130 is configured to generate a signal only when the angle of incline is 20 degrees or more (e.g., relative to the X-axis, the Y-axis, etc.). In other embodiments, the controller 130 is configured to generate a signal when the angle of incline is between 25 degrees and 80 degrees (e.g., relative to the X-axis, the Y-axis, etc.).

In further embodiments, the controller 130 is configured to generate a signal based on the information detected by the vehicle location sensor 118. More specifically, the vehicle location sensor 118 is configured to detect a location of the utility vehicle 10. The controller 130 may be configured to determine, based on the utility vehicle's location, the angle of incline of the surface or ground 58 along which the utility vehicle 10 is moving, and generate a signal to permit adjustment of the operator support 78 and/or automatically adjust the position of the operator support 78 relative to the chassis 14, as discussed above.

In various different implementations, the systems and methods described herein (e.g., control system 34) may be implemented by computer-based systems including, for example, a non-transitory computer-readable memory storing computer-executable instructions that are executed by an electronic processor. In some implementations, various different processing techniques may be used in addition to or instead of those described in the examples above. For example, in some implementations, the systems may be configured or adapted to utilize machine-learning or artificial intelligence mechanisms (e.g., one or more artificial neural networks) for automated decision-making, identification, and/or classification tasks and may be further configured to update or "retrain" the machine-learning or artificial intelligence mechanism based on observed and/or user-provided data during use of the system. More specifically, in some embodiments, the control system 34 is configured to update the machine-learning or artificial intelligence mechanism based on the information and commands received and transmitted to and from the different components, such as the vehicle operation system 74, the operator support 78, and the sensor unit 110. In one example, the machine-learning or artificial intelligence mechanism is configured to be updated based on the information detected by the sensor unit 110, and the adjustment of the operator support 78 in relation to the information detected by the sensor unit 110.

Certain adjustments of the operator support 78 are necessary to do a job efficiently and for the operator to attain the comfort needed for long hours in the cab 30. Automatic or semi-automatic controls of the operator support 78 saves valuable time on site.

Although the present subject matter has been described in detail with reference to certain embodiments, variations and modifications exist within the scope of one or more independent aspects of the present subject matter, as described.

One or more independent features and/or independent advantages of the disclosure may be set forth in the claims.

What is claimed is:

1. A utility vehicle comprising:
    a chassis;
    a prime mover supported by the chassis;
    a work implement movably coupled to the chassis;
    an operator cab supported by the chassis;
    an operator support positioned within the operator cab, the operator support including a seat and a backrest coupled to the seat, the operator support configured to support an operator of the utility vehicle, and wherein a position of the operator support is selectively adjustable relative to the chassis; and
    a control system in communication with the operator support, the control system including
        a first sensor operable to sense a position of the work implement relative to the chassis,
        a second sensor operable to sense a position of the operator support relative to a side of the operator cab, and
        a controller including a processor and a memory, the controller configured to
            receive a first signal from the sensor representative of the position of the work implement, and
            receive a second signal from the second sensor representative of the position of the operator support relative to the side of the operator cab, wherein the controller is further configured to generate a signal to automatically adjust the position of the operator support relative to the chassis based in part on the position of the work implement relative to the chassis and the position of the operator support relative to the side of the operator cab.

2. The utility vehicle of claim 1, wherein the chassis includes a floor surface, wherein the operator support is supported by the floor surface, and wherein the operator support is movable parallel to the floor surface.

3. The utility vehicle of claim 1, wherein the chassis includes a floor surface, wherein the operator support includes an axis extending normal to the floor surface, and wherein the operator support is rotatable about the axis.

4. The utility vehicle of claim 1, further comprising a lock mechanism operatively coupled to the operator support, the lock mechanism selectively adjustable between a first state in which the operator support is maintained in the position relative to the chassis, and a second state in which the operator support is permitted to move relative to the chassis, wherein the controller is configured to generate a signal to adjust the lock mechanism between the first state and the second state based in part on the position of the work implement relative to the chassis.

5. The utility vehicle of claim 1, further comprising an actuator operatively coupled to the operator support, the actuator configured to adjust the position of the operator support relative to the chassis.

6. The utility vehicle of claim 5, wherein the seat of the operator support includes a base supported by a floor surface of the chassis and the actuator is operatively coupled to the base.

7. The utility vehicle of claim 1, wherein the utility vehicle includes a longitudinal axis extending therethrough, wherein the utility vehicle is operable to move along a direction of travel coinciding with the longitudinal axis, wherein the utility vehicle includes a first side and a second side opposite the first side relative to the longitudinal axis, wherein the work implement is movable between a first position in which the work implement is positioned on the first side, and a second position in which the work implement is positioned on the second side, and wherein the operator support is adjustable between a first position and a second position coinciding with the first position and the second position, respectively, of the work implement.

8. The utility vehicle of claim 7, wherein the first position of the operator support is positioned closer toward the first side of the utility vehicle, and wherein the second position of the operator support is positioned closer to the second side of the utility vehicle.

9. A utility vehicle comprising:
    a chassis;
    a prime mover supported by the chassis;
    a work implement movably coupled to the chassis;
    an operator cab supported by the chassis;
    an operator support positioned within the operator cab, the operator support including a seat and a backrest coupled to the seat, the operator support configured to support an operator of the utility vehicle, and wherein a position of the operator support is selectively adjustable relative to the chassis; and
    a control system in communication with the operator support, the control system including
        a sensor operable to sense a position of the work implement relative to the chassis, and
        a controller including a processor and a memory, the controller configured to
            receive a signal from the sensor representative of the position of the work implement, and
            receive the position of the operator support,
        wherein the controller is further configured to generate a signal to permit adjustment of the position of the operator support relative to the chassis based in part on the position of the work implement relative to the chassis and the position of the operator support relative to a side of the operator cab.

10. The utility vehicle of claim 9, further comprising a lock mechanism operatively coupled to the operator support, the lock mechanism selectively adjustable between a first state in which the operator support is maintained in the position relative to the chassis, and a second state in which the operator support is permitted to move relative to the chassis, wherein the controller is configured to generate a signal to adjust the lock mechanism between the first state and the second state based in part on the position of the work implement relative to the chassis.

11. The utility vehicle of claim 9, further comprising an actuator operatively coupled to the operator support, the actuator configured to selectively adjust the position of the operator support relative to the chassis.

12. The utility vehicle of claim 11, wherein the seat of the operator support includes a base supported by a floor surface of the chassis and the actuator is operatively coupled to the base.

13. The utility vehicle of claim 11, wherein the controller is configured to generate a signal to actuate the actuator based in part on the position of the work implement relative to the chassis.

14. The utility vehicle of claim 9, wherein the utility vehicle includes a longitudinal axis extending therethrough, wherein the utility vehicle is operable to move along a direction of travel coinciding with the longitudinal axis, wherein the utility vehicle includes a first side and a second side opposite the first side relative to the longitudinal axis, wherein the work implement is movable between a first position in which the work implement is positioned on the first side, and a second position in which the work implement is positioned on the second side.

15. The utility vehicle of claim 14, wherein the operator support is adjustable between a first state and a second state coinciding with the first position and the second position, respectively, of the work implement, and wherein the operator support is maintained in the position relative to the chassis when in the first state, and the operator support is permitted to move relative to the chassis when in the second state.

16. A utility vehicle comprising:
a chassis;
a prime mover supported by the chassis;
a work implement movably coupled to the chassis;
an operator cab supported by the chassis;
an operator support positioned within the operator cab, the operator support including a seat and a backrest coupled to the seat, the operator support configured to support an operator of the utility vehicle, and wherein a position of the operator support is selectively adjustable relative to the chassis; and
a control system in communication with the operator support, the control system including
a sensor assembly operable to sense an angle of incline of a ground surface upon which the utility vehicle moves, and
a controller including a processor and a memory, the controller configured to
receive a signal from the sensor assembly representative of the angle of incline, and
receive the position of the operator support,
wherein the controller is further configured to generate a signal to permit adjustment of the position of the operator support relative to the chassis based in part on the angle of incline and the position of the operator support relative to a side of the operator cab.

17. The utility vehicle of claim 16, wherein the chassis includes a floor surface, wherein the operator support is supported by the floor surface, and wherein the operator support is movable parallel to the floor surface.

18. The utility vehicle of claim 16, wherein the chassis includes a floor surface, wherein the operator support includes an axis extending normal to the floor surface, and wherein the operator support is rotatable about the axis.

19. The utility vehicle of claim 16, further comprising a lock mechanism operatively coupled to the operator support, the lock mechanism selectively adjustable between a first state in which the operator support is maintained in the position relative to the chassis, and a second state in which the operator support is permitted to move relative to the chassis, wherein the controller is configured to generate a signal to adjust the lock mechanism between the first state and the second state based in part on the angle of incline.

20. The utility vehicle of claim 16, further comprising an actuator operatively coupled to the operator support, the actuator configured to selectively adjust the position of the operator support relative to the chassis, and wherein the controller is configured a generate a signal to actuate the actuator based in part on the angle of incline.

* * * * *